US008943420B2

(12) United States Patent
Goldthwaite et al.

(10) Patent No.: US 8,943,420 B2
(45) Date of Patent: Jan. 27, 2015

(54) AUGMENTING A FIELD OF VIEW

(75) Inventors: Flora P. Goldthwaite, Seattle, WA (US); Brett D. Brewer, Sammamish, WA (US); Eric I-Chao Chang, Haiden District (CN); Jonathan C. Cluts, Sammamish, WA (US); Karim T. Farouki, Seattle, WA (US); Gary W. Flake, Bellevue, WA (US); Janet Galore, Seattle, WA (US); Jason Garms, Woodinville, WA (US); Abhiram G. Khune, Sammamish, WA (US); Oscar Murillo, Seattle, WA (US); Sven Pleyer, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 984 days.

(21) Appl. No.: 12/486,964

(22) Filed: Jun. 18, 2009

(65) Prior Publication Data

US 2010/0325563 A1 Dec. 23, 2010

(51) Int. Cl.

| | |
|---|---|
| ***G06F 3/048*** | (2013.01) |
| ***G06T 19/00*** | (2011.01) |
| ***G06F 3/0481*** | (2013.01) |
| ***G06T 17/05*** | (2011.01) |

(52) U.S. Cl.

CPC .......... *G06T 19/006* (2013.01); *G06F 3/04815* (2013.01); *G06T 17/05* (2013.01)

USPC .......................................... 715/757; 345/633

(58) Field of Classification Search

CPC .... G06T 19/006; G06T 17/05; G06T 3/04815

USPC .......................................... 715/757; 345/633

See application file for complete search history.

(56) References Cited

U.S. PATENT DOCUMENTS

| | | | | |
|---|---|---|---|---|
| 5,515,492 | A * | 5/1996 | Li et al. ......................... | 715/744 |
| 5,844,824 | A | 12/1998 | Newman et al. | |
| 5,886,683 | A | 3/1999 | Tognazzini et al. | |
| 6,094,625 | A * | 7/2000 | Ralston ......................... | 702/150 |
| 6,199,014 | B1 * | 3/2001 | Walker et al. ................ | 701/428 |

(Continued)

FOREIGN PATENT DOCUMENTS

WO 2006110472 A2 10/2006

OTHER PUBLICATIONS

Magic Mirror—Jan. 2002 http://www.3dyeroo.com/index.htm. Last accessed Sep. 4, 2008, 2 pages.

(Continued)

*Primary Examiner* — Anil Bhargava

(74) *Attorney, Agent, or Firm* — Ben Tabor; David Andrews; Micky Minhas

(57) ABSTRACT

The claimed subject matter relates to an architecture that can enhance an experience associated with indicia related to a local environment. In particular, the architecture can receive an image that depicts a view of the local environment including a set of entities represented in the image. One or more of the entities can be matched or correlated to modeled entities included in a geospatial model of the environment, potentially based upon location and direction, in order to scope or frame the view depicted in the image to a modeled view. In addition, the architecture can select additional content that can be presented. The additional content typically relates to services or data associated with modeled entities included in the geospatial model or associated with modeled entities included in an image-based data store.

19 Claims, 11 Drawing Sheets

(56) References Cited

U.S. PATENT DOCUMENTS

| | | | | |
|---|---|---|---|---|
| 6,321,158 | B1 | 11/2001 | DeLorme et al. | |
| 6,424,910 | B1 | 7/2002 | Ohler et al. | |
| 6,778,171 | B1 * | 8/2004 | Kikinis | 345/419 |
| 6,803,928 | B2 | 10/2004 | Bimber et al. | |
| 7,117,254 | B2 | 10/2006 | Lunt et al. | |
| RE40,014 | E | 1/2008 | Edwards | |
| 7,389,170 | B2 | 6/2008 | Nakao | |
| 7,395,507 | B2 | 7/2008 | Robarts et al. | |
| 7,460,953 | B2 * | 12/2008 | Herbst et al. | 701/211 |
| 7,583,275 | B2 * | 9/2009 | Neumann et al. | 345/633 |
| 8,237,791 | B2 * | 8/2012 | Chen et al. | 348/143 |
| 2002/0044162 | A1 * | 4/2002 | Sawatari | 345/852 |
| 2002/0080094 | A1 | 6/2002 | Biocca et al. | |
| 2003/0209893 | A1 | 11/2003 | Breed et al. | |
| 2004/0093466 | A1 | 5/2004 | Hull | |
| 2004/0104935 | A1 * | 6/2004 | Williamson et al. | 345/757 |
| 2004/0105573 | A1 * | 6/2004 | Neumann et al. | 382/103 |
| 2004/0135744 | A1 | 7/2004 | Bimber et al. | |
| 2005/0122308 | A1 | 6/2005 | Bell et al. | |
| 2006/0004512 | A1 * | 1/2006 | Herbst et al. | 701/208 |
| 2006/0028400 | A1 | 2/2006 | Lapstun et al. | |
| 2006/0038833 | A1 * | 2/2006 | Mallinson et al. | 345/633 |
| 2006/0050993 | A1 | 3/2006 | Stentiford | |
| 2006/0105838 | A1 * | 5/2006 | Mullen | 463/31 |
| 2006/0109237 | A1 | 5/2006 | Morita et al. | |
| 2006/0227047 | A1 | 10/2006 | Rosenberg | |
| 2006/0241857 | A1 | 10/2006 | Onishi et al. | |
| 2007/0124157 | A1 * | 5/2007 | Laumeyer et al. | 705/1 |
| 2007/0194902 | A1 * | 8/2007 | Blanco et al. | 340/461 |
| 2007/0214141 | A1 | 9/2007 | Sittig | |
| 2007/0244633 | A1 * | 10/2007 | Phillips et al. | 701/207 |
| 2007/0273610 | A1 * | 11/2007 | Baillot | 345/8 |
| 2008/0040370 | A1 | 2/2008 | Bosworth et al. | |
| 2008/0114808 | A1 | 5/2008 | Morita et al. | |
| 2008/0132251 | A1 | 6/2008 | Altman et al. | |
| 2008/0221745 | A1 * | 9/2008 | Diamandis et al. | 701/3 |
| 2008/0262714 | A1 | 10/2008 | Abramovich Ettinger | |
| 2008/0294663 | A1 | 11/2008 | Heinley et al. | |
| 2009/0008450 | A1 | 1/2009 | Ebert et al. | |
| 2009/0289955 | A1 * | 11/2009 | Douris et al. | 345/630 |
| 2009/0289956 | A1 * | 11/2009 | Douris et al. | 345/633 |
| 2009/0300100 | A1 * | 12/2009 | Freer | 709/203 |
| 2010/0125812 | A1 | 5/2010 | Hartman et al. | |
| 2010/0313146 | A1 * | 12/2010 | Nielsen et al. | 715/757 |
| 2011/0264743 | A1 * | 10/2011 | Baumert et al. | 709/204 |

OTHER PUBLICATIONS

2007 Finalist Teams http://www.entrepreneurshipchallenge.org/2007%20Teams.htm. Last accessed Sep. 3, 2008, 4 pages.

Avery Dennison—Le Coq Sportif is Developing Radically Innovative Retail Applications Based on NFC (Near Field Communication) and RFID Technologies. May 19, 2008 http://www.bishopsgatecommunications.com/news_details.php?id=343. Last accessed Sep. 3, 2008, 3 pages.

Nokia's Primary Market, Oct. 31, 2007, Jackson Blog. http://www.stanford.edu/group/jacksonlibrary/blog/2007/10/. Last accessed Sep. 3, 2008, 10 pages.

Paxar Rolls out New Prototype RFID Mirror, Nov. 21, 2006. http://www.itrportal.com/absolutenm/templates/article-rfid.aspx?articleid=3685&zoneid=49. Last accessed Sep. 3, 2008, 2 pages.

Magic Mirror Lightbox http://www.bikudo.com/product_search/details/39250/magic_mirror_lightbox.html#desc. Last accessed Sep. 3, 2008, 3 pages.

The Information Weekly, "Dipity Do Social Timelines," Fritz Nelson's Instigator, Mar. 4, 2008, http://www.informationweek.com/blog/main/archives/2008/03/ dipity_do_socia.html, 2 pages.

TechCrunch, "FriendFeed to Aggregate Social Network Data Into a Single Feed," Oct. 1, 2007, http://www.techcrunch. com/2007/10/01/friendfeed-taking-a-poke-at-the-monster-social-networks/, 19 pages.

Mashable: All That's New on the Web, "Show off Your Activity Stream on a Timeline with Dipity 2.0," Sep. 5, 2008, http://mashable.com/ 2008/09/05/dipity-2/, 5 pages.

Oyekoya et al., "An Eye Tracking Interface for Image Search", University College London, UK, retrieved Jan. 9, 2009, http://www.cs.ucl.ac.uk/staff/W.Oyekoya/ETRAWole.pdf; 1 page.

Oyekoya et al., "A Performance comparison of Eye Tracking and Mouse Interfaces in a Target Image Identification Task", European Workshop on the Integration of Knowledge, Semantics & Digital Media Technology, London, UK, Nov. 30-Dec. 1, 2005; http://www.ee.ucl.ac.uk/~fstentif/OyekoyaStentifordEWIMT2005.pdf; 6 pages.

Puolamaki et al., "Combining Eye Movements and collaborative Filtering for Proactive Information Retrieval", SIGIR'05, Aug. 15-19, 2005, Salvador, Brazil; http://www.cis.hut.fi/projects/mi/papers/sigir05.pdf; 8 pages.

Non-Final Office Action mailed Oct. 11, 2011 regarding U.S. Appl. No. 12/398,109 15 pages.

Office Action mailed Jan. 27, 2012 regarding U.S. Appl. No. 12/398,280 15 pages.

Final Office Action mailed Mar. 20, 2012 regarding U.S. Appl. No. 12/398,109 16 pages.

Final Office Action mailed May 9, 2012 regarding U.S. Appl. No. 12/398,280 18 pages.

Notice of Allowance mailed Aug. 24, 2012 regarding U.S. Appl. No. 12/398,280 10 pages.

Notice of Allowance mailed Dec. 14, 2012 regarding U.S. Appl. No. 12/398,280 7 pages.

* cited by examiner

AUGMENTING A FIELD OF VIEW

CROSS-REFERENCE TO RELATED APPLICATIONS

This application is related to U.S. application Ser. No. (MSFTP2518US) Ser. No. 12/398,280, filed on Mar. 5, 2009, entitled "AUGMENTING A FIELD OF VIEW IN CONNECTION WITH VISION-TRACKING." The entirety of this application is incorporated herein by reference.

BACKGROUND

Since commercial access was first granted to Global Positioning System (GPS) and other Global Navigation Satellite Systems (GNSS), as well as various other Location-Based Services (LBS), numerous applications have been built around understanding a user's location, and leveraging that location knowledge, often in connection with a stated destination or near-by points of potential interest. For example, GPS navigation systems where first used in connection with 2-D orthographic projection maps to aid users in getting from one point to another. Eventually, however, GPS (or other LBS systems) expanded to aid in discovering and delivering general information about a user's current location, and could potentially include local business listings, advertisements and so forth.

Hence, given a user's location, conventional devices can provide directions to specific locations and, in some cases, allow users to discover services or content relevant to the current location. Such services can even be helpful at a street-level scale. However, current systems and methods for understanding the location of a user such as GPS do not provide the granularity to understand a user's real context in many ways.

SUMMARY

The following presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented later.

The subject matter disclosed and claimed herein, in one or more aspects thereof, comprises an architecture that can enhance or enrich an experience associated with a field of view of a local environment. In accordance therewith and to other related ends, the architecture can receive an image depicting a specific portion of a local environment. As one example, consider a conventional device that can image a portion of the local environment and display that image to an associated display device. The local view (e.g. described by the image) can include a set of entities that can be matched to various modeled entities included in a geospatial model of the environment. Thus, the architecture can scope a modeled view to match the perspective of the view depicted in the image by matching one or more entities (e.g., environment entities) to one or more modeled entities.

Accordingly, in addition to understanding a user's location, which is employed by many conventional systems, the architecture can also understand where and at what a user is currently looking, and can leverage such information to provide previously unattainable levels of personal context and/or more personal or contextual relationships with the environment. For example, based upon the scoped modeled view, the architecture can select additional content associated with one or more modeled entities included in the geospatial model. In addition, all entities included in the view need not have a corresponding entity in the geospatial model. Rather, some entities (e.g., object entities) can correspond to modeled entities included in an image-based data store. However, regardless of whether entities in the view are matched to modeled entities in the geospatial model or to modeled entities included the image-based data store, additional content associated with those modeled entities can be presented. The additional content can relate, e.g. to services or information associated with one or more modeled entities.

For example, the architecture can transform the image by overlaying that image with the additional content and outputting the combination to a display. Additionally or alternatively, the architecture can expose features of entities or modeled entities in the presentation that are occluded or nonexistent in the view. It should be appreciated that the additional content is not limited only to visual content, but can be audio content as well.

The following description and the annexed drawings set forth in detail certain illustrative aspects of the claimed subject matter. These aspects are indicative, however, of but a few of the various ways in which the principles of the claimed subject matter may be employed and the claimed subject matter is intended to include all such aspects and their equivalents. Other advantages and distinguishing features of the claimed subject matter will become apparent from the following detailed description of the claimed subject matter when considered in conjunction with the drawings.

DETAILED DESCRIPTION

Figure 1:
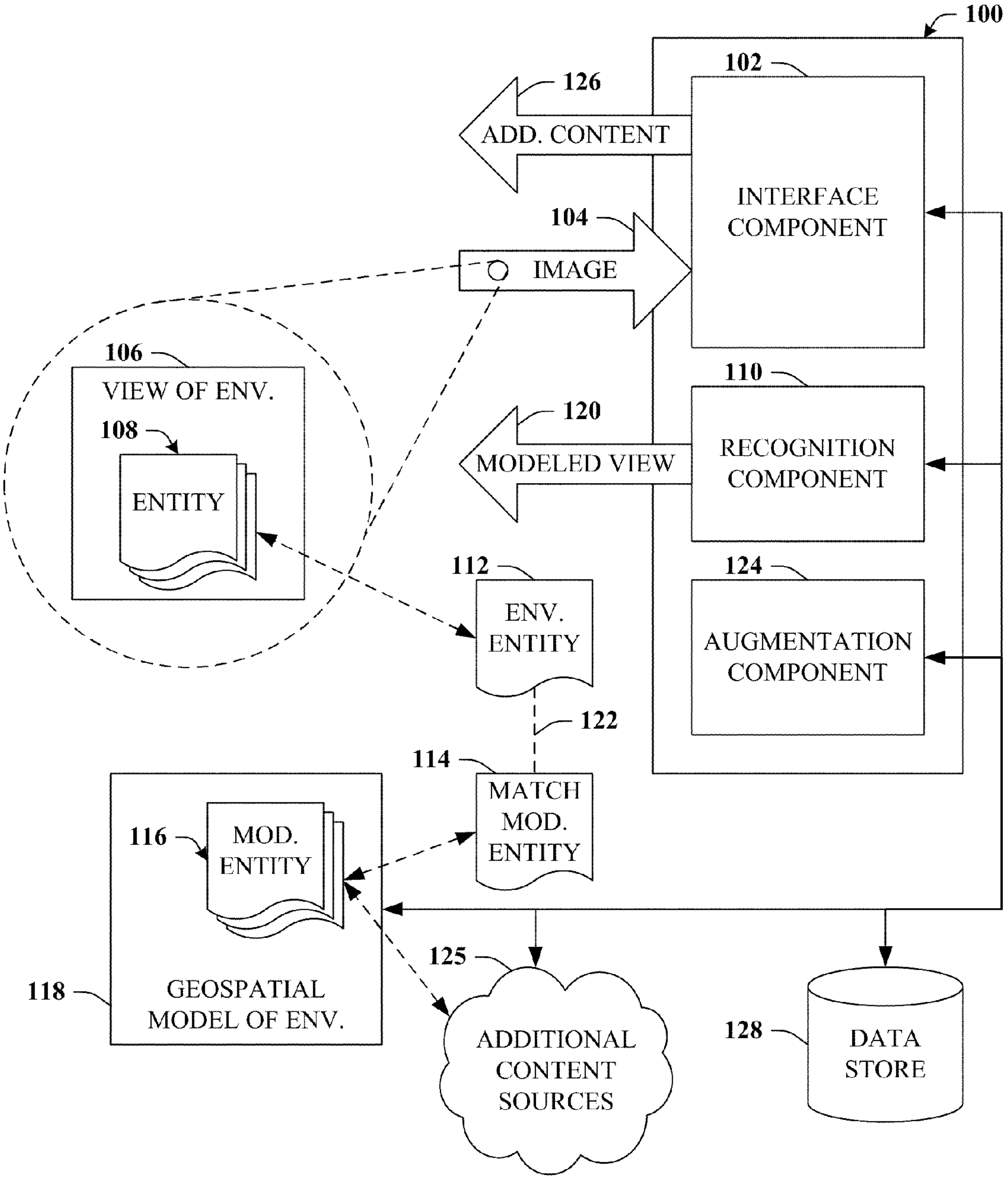
FIG. 1 illustrates a block diagram of a computer-implemented system that can enhance an experience associated with a field of view of a local environment.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "module," "system," or the like can, but need not, refer to a computer-related entity, either hardware, a combination of hardware and software, software, or software in execution. For example, a component might be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g. card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." Therefore, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms "infer" or "inference" generally refer to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring now to the drawings, with reference initially to FIG. 1, computer-implemented system 100 that can enhance an experience associated with a field of view of a local environment is depicted. Generally, system 100 can include interface component 102 that can receive image 104. Image 104 can be substantially any type of visual-based content, including, e.g. a still image or video. Interface component 102 can include or be operatively coupled to a physical display suitable for presenting image 104 as well as other content or media. Moreover, it should be appreciate that system 100 can be implemented entirely or in part in a device that is capable of capturing or creating image 104 and delivering image 104 to interface component 102, such as a camera or recorder; or devices that include a camera such as, e.g., a cellular phone, a smart phone, a Personal Digital Assistant (PDA), a laptop, a media device, or similar devices as well as a headset, specially equipped glasses, or other wearable devices, and so on. In general, the term "local environment" is intended to refer to the surroundings of the imaging device that captures image 104. Oftentimes, this device will also include a display for visually presenting view 106 depicted by image 104.

As is illustrated by the exploded portions, image 104 can be encoded data or a stream that, when rendered or decoded, depicts a view of a local environment (e.g., view 106). In particular, view 106 can be a specific portion of the local environment that includes set 108 of entities. An entity included in set 108 can relate to an object, feature, or element included in or depicted by view 106, which is further detailed in connection with FIGS. 3 and 4. The entity can be classified as one or both an environment entity or an object entity, which is discussed further with reference to FIG. 5. As a brief introduction, however, environment entities typically relate to inert or structural features (e.g., a building or a road) of the environment, whereas object entities usually refer to movable, variable, or impermanent features or articles (e.g., a book or an advertisement) of the environment.

In addition, system 100 can also include recognition component 110 that can match an entity from set 108 to a modeled entity that is a member of set 116 of modeled entities, wherein set 116 of modeled entities is included in geospatial model 118 of the environment. In essence, geospatial model 118 can include a 3-dimensional, spatially accurate representation of not only the local environment (e.g., a room or a city block), but of other environments (e.g., other city blocks or the entire city) or a universe of locales or environments (e.g., a model of the entire Earth or beyond). It should be appreciated that the geospatial model can be a street-level or non-orthogonal model that can thus be much more detailed or granular than conventional satellite mapping based geomaps. Moreover, geospatial model 118 can include historic representations of the environment, future representations of the environment, as well as current or present-day representations. In addition, geospatial model 118 can include markers or tags to past, present, or future events or objects associated with a location. Appreciably, although image 104 will often include many identifiable entities, those selected for correlations with geospatial model 118 will typically be classified as environment entities. Thus, recognition component 110 can identify and match environment entity 112 (e.g. an environment entity from set 108 included in view 106 captured by image 104) to corresponding modeled entity 114, which can be a member of (or portion of) set 116 included in geospatial model 118.

Based upon correlations 122 between environment entity 112 and modeled entity 114, recognition component 110 can scope and/or define corresponding modeled view 120. For example, based upon view 106 as depicted by image 104, recognition component 110 can identify a matching or analogous view of geospatial model 118. Put another way, whereas image 104 can capture a particular, bounded perspective of the real, physical world, modeled view 120 that is scoped by recognition component 110 can represent the same perspective and scope as that depicted in image 104, yet applied to a modeled landscape of geospatial model 118 rather than to the physical world. One benefit of mapping a real view (e.g., view 106) to a modeled view (e.g., modeled view 120) is that experiences associated with a presentation of the real view can be readily enhanced. As one example, the real view is essentially limited to that which is expressly depicted by image 104, whereas geospatial model 118 can be examined to identify elements or features that are not included in the real view, such as elements or features occluded from view, but within the scope of the view, or elements or features that are just outside of the real view. Thus, when recognition component 110 scopes or frames modeled view 120 (to match the current real physical view 106), recognition component 110 can further identify numerous other entities included in set 108 without necessarily examining the image 104, but rather by reference to geospatial model 118 and/or set 116 of modeled entities. Similarly, recognition component 110 can also readily identify entities that are occluded or not present in view 106 (or image 104) by referencing geospatial model 118—a feat that would not be feasible by looking at view 106 alone. Moreover, various information or services (e.g. additional content 126) associated with one or more modeled entity 116 can be exposed, e.g. in connection with a presentation of image 104 that includes related entities 108. In addition, in one or more aspects of the claimed subject matter, additional content 126 associated with a modeled entity 116 can be presented in a variable manner based upon whether or not image 104 or view 106 includes an associated entity 108. In other words, the presentation of additional content 126 can be different when associated with entity 108 that is included in the current view 106 relative to the case in which additional content 126 is associated with an entity that is occluded from the physical view 106. For example, additional content 126 can be directed to accentuating or highlighting an observable entity in the first case, while providing an outline or wireframe of an occluded entity in the second case.

Figure 2:
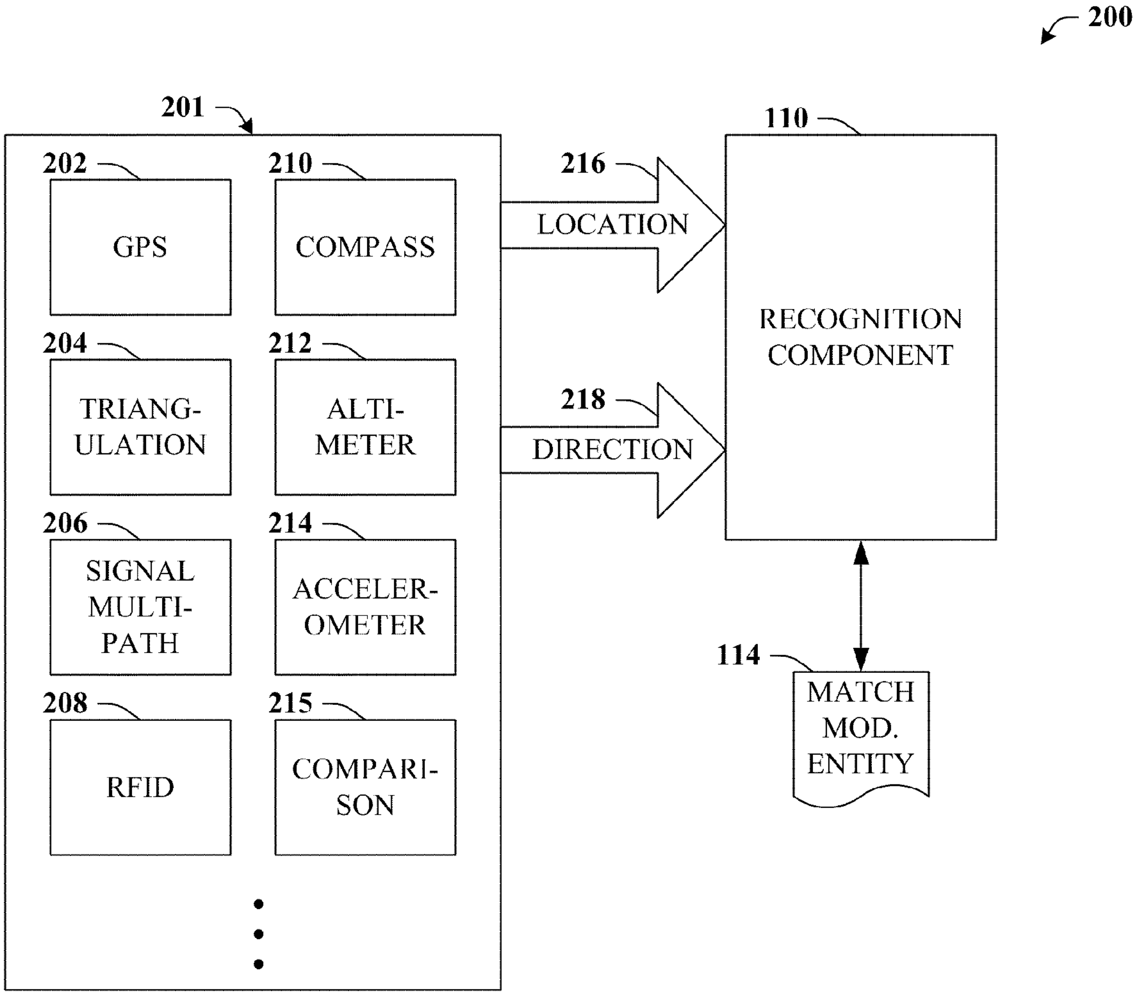
FIG. 2 is a block diagram of a system that can receive orientation indicia in order to scope the modeled view.

While still referring to FIG. 1, but turning simultaneously to FIG. 2, system 200 that can receive orientation indicia in order to scope the modeled view is illustrated. In particular, system 100 or components thereof can be operatively coupled to set 201 of sensors or other indicia. As detailed supra, all or portions of system 100 can be embodied in a device capable of receiving and/or capturing image 104. Likewise, such a device can also further include all or portions of the sensors or indicia included in set 201. Largely, set 201 pertains to devices or sensors that can accurately identify or determine one or more aspects of location, direction, and/or orientation; and, as such, will be situated in whole or in part in the local environment.

To provide a few concrete examples, set 201 can include Global Positioning System (GPS) unit 202, which can provide precise indications of location, time, and speed. Of course, other techniques for determining location can also be employed such as signal triangulation (or trilateration) 204. For example, signal strength measures at various stationary transceivers can be measured by well-known means in order to pinpoint the location of the transmitting device. One such example is Wireless Application Protocol (WAP), wherein radiolocation, triangulation, and/or trilateration can be employed in connection with radio waves or other electromagnetic radiation.

Set 201 can also include devices or techniques associated with signal multipath 206, wherein the same signal is received multiple times, generally due to reflection or interference between the transmitter and receiver. Furthermore, well-known techniques associated with Radio Frequency ID (RFID) 208 can also be employed to determine features associated with location or orientation. In addition, devices or indicia related to a directional compass 210, including but not limited to a magnetic compass, a gyrocompass, an astrocompass, or an electronic compass. Likewise, altitude can be determined based upon substantially any type of altimeter 212; whereas certain motions, gestures, or accelerations can be determined by accelerometer 214. Of course, numerous other devices or techniques can be employed in connection with the claimed subject matter, such as clocks, range finders, direction finders and so forth. Moreover, the indicia provided can also include a comparison of view 106 with modeled view 120, e.g., employing recursive comparisons to increase precision with respect to position and/or orientation.

In an aspect of the claimed subject matter, recognition component 110 can employ indication of location 216 and indication of direction 218 in order to match environment entity 112 with modeled entity 114. Indication of location 216 or indication of direction 218 can be recorded by one or more members of set 201 at the time when image 104 is created. Thus, such location and direction data (e.g., indications 216 and 218) can be embedded and/or included in image 104 as it is captured. Upon receipt of indication of location 216, recognition component 110 can identify a geographic origin (e.g., the local environment) of the real view 106, which can be precisely mapped to the geospatial model 118, and can establish the appropriate locale and the origin for modeled view 120. However, just as an individual standing at a particular location cannot simultaneously perceive the local environment from every conceivable angle, but rather focuses in a single direction at a given time; indication of direction 218 can be employed to determine or scope the direction of focus of view 106 and/or image 104. Once location and direction have been ascertained, the process of identifying a matching modeled entity 114 can be greatly simplified, as can properly scoping modeled view 120.

Continuing the discussion of FIG. 1, it should be understood that system 100 can also include or be operatively connected to data store 128. Data store 128 is intended to be a repository of all or portions of data, data sets, or information described herein or otherwise suitable for use with the claimed subject matter, and can potentially include other information stores or sources such as all or portions of additional content sources 125, geospatial model 118, or an image-based data store 504 discussed in connection with FIG. 5. Data store 128 can be centralized, either remotely or locally cached, or distributed, potentially across multiple devices and/or schemas. Furthermore, data store 128 can be embodied as substantially any type of memory, including but not limited to volatile or non-volatile, sequential access, structured access, or random access and so on. It should be understood that all or portions of data store 128 can be included in system 100, or can reside in part or entirely remotely from system 100.

In addition, system 100 can also include augmentation component 124 that can select additional content 126 that is associated with one or more modeled entities included in set 116, potentially from a variety of additional content sources 125 including but not limited to proprietary data stores, web-accessible content, cloud-accessible content, client-shared data stores or the like. Hence, additional content sources 125 can include Geographic Information Systems (GIS), public records, media companies, government provided information, non-government organizations, and can even include or access various personal or private information such as social networks, personal calendars or schedules, preferences, contacts, behaviors or the like, which is further discussed in connection with profiles detailed infra.

Appreciably, set 116 can include substantially any modeled entity included in geospatial model 118 (or image-based data store 504 discussed infra), but can be limited in some cases to only those modeled entities that exist in modeled view 120 or a near proximity to or periphery of modeled view 120. In either case, it should be understood that modeled view 120 can include modeled entities 116 that correspond to representations of real entities 108, such as those that are either visible or occluded in image 104. Understandably, augmentation component 124 can operate as a first level of scalability by surfacing more or less content selectively based upon, e.g., the quantity of additional content 126 relevant to current view 106. A number of examples of the above-mentioned and other features are illustrated with reference to FIGS. 3 and 4, both of which are discussed while still referencing FIG. 1.

Figure 3:
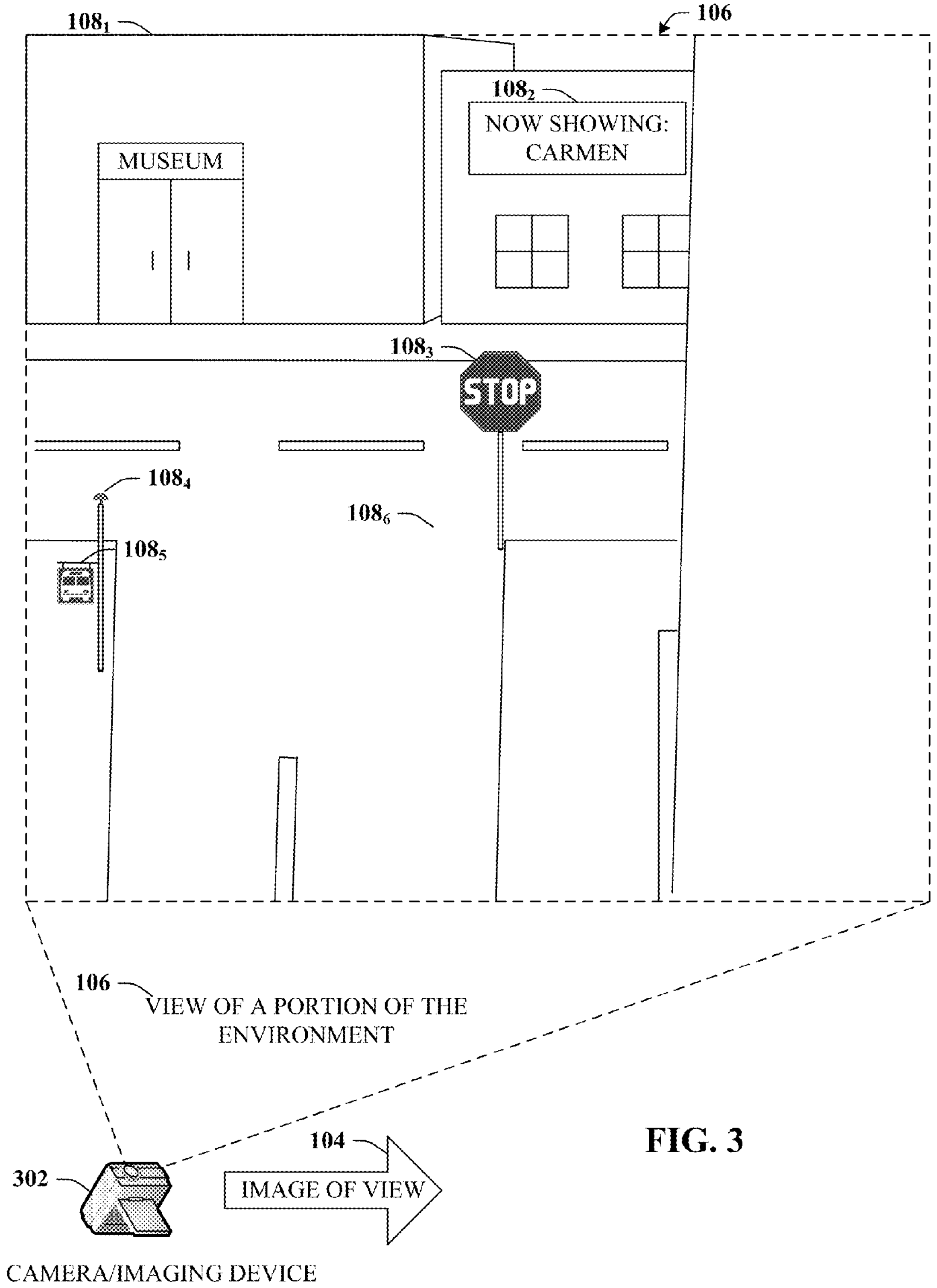
FIG. 3 provides a block diagram of a graphic illustration of an example view of a local environment.

Turning now to FIG. 3, a graphic illustration of an example view of a local environment is provided. Thus, view 106 comprises a specific portion of a local environment, in this case, the scene captured by camera 302, which can capture view 106 and can output the associated image 104. As with substantially any view, example view 106 depicted here includes a number of entities 108, which can be classified at least for purposes of ease of explanation as one or both of environment entities or object entities. In particular, a number of entities, labeled as $\mathbf{108_1}$-$\mathbf{108_6}$ are referenced in example view 106, but it should be understood that various other entities do or could exist. Entity $\mathbf{108_1}$ references the building that houses a museum, while entity $\mathbf{108_2}$ references a marquee of the adjacent building, in this case an opera house that is advertising a production of Carmen. Entity $\mathbf{108_3}$ refers to a stop sign, entity $\mathbf{108_4}$ refers to a street lamp, entity $\mathbf{108_5}$ refers to a bus stop sign, and entity $\mathbf{108_6}$ refers to a street or an intersection of two streets. Appreciably, interface component 102 (and other components of system 100) can be included in camera 302 (or any other suitable device) and can receive image 104 depicting view 106, which is illustrated in connection with FIG. 4.

Figure 4:
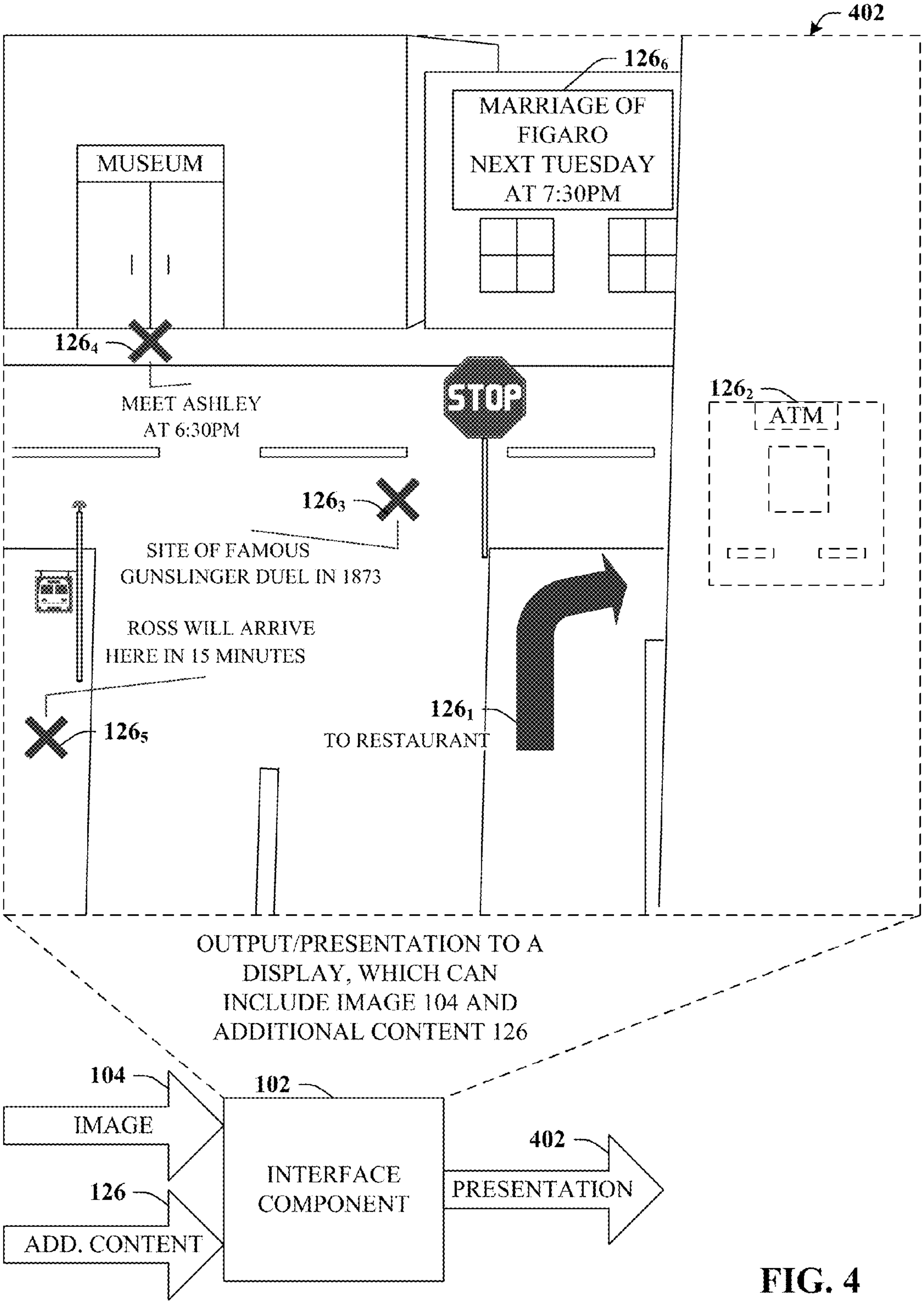
FIG. 4 illustrates a block diagram of a graphic illustration of example presentation 402 that depicts features associated with an augmented presentation of image 104.

FIG. 4 provides a graphic illustration of example presentation 402 that depicts features associated with an augmented presentation of image 104. As described supra, interface component 102 can receive image 104 and additional content 126; and can output additional content 126 in the form of presentation 402, typically along with image 104. Presentation 402 can therefore provide the same visual perspective and scope as that of view 106, yet augmented with additional content 126. In other cases, presentation 402 can be of differing dimensions; for example, due to a size or resolution of the display to which presentation 402 is output. Thus, presentation 402 can be cropped or expanded, the latter potentially based upon other views 106 or other images 104 or by casting modeled entities 116 from geospatial model 118 onto presentation 402.

Accordingly, in an aspect of the claimed subject matter, interface component 102 can provide presentation 402 by presenting view 106 (e.g., example view illustrated in FIG. 3) and overlaying view 106 with additional content 126. As one example, consider a pedestrian who captures an image of example view 106 from FIG. 3, with the resultant image 104 output to a display screen as presentation 402. Further suppose the pedestrian is searching for an Italian cuisine restaurant. In accordance therewith, interface component 102 can overlay additional content $\mathbf{126_1}$, which is an indication of the route to the nearest Italian restaurant. Understanding that the pedestrian is searching for an Italian restaurant can be expressly input, but can also be determined or inferred based upon profile information (e.g., the pedestrian enjoys Italian food and/or typically eats lunch at this time of day) and/or based upon an advertising model, which is further detailed with reference to FIG. 6.

Additionally or alternatively, interface component can expose a feature of a modeled entity included in set 116 of modeled entities, wherein the feature is occluded or non-existent in the view. An example can be found with reference to additional content $\mathbf{126_2}$. Additional content $\mathbf{126_2}$ depicts an Automated Teller Machine (ATM) displayed as an outline to indicate the location of the ATM that, while not in the line of sight, is just around the next corner, mounted on the nearby street-side building.

It should be appreciated that additional content 126 need not be only visual-based content, but can be in other forms as well, such as audio-based content. For example, additional content 126 can be an audio stream associated with one or more modeled entities 116 included in geospatial model 118 or elsewhere. In an aspect, interface component 102 can present (e.g., as part of presentation 402) the audio stream when view 106 is substantially focused on an entity 108 or a location that corresponds to a modeled entity 116. For example, although not depicted here, suppose the view 106 is substantially centered on an informative plaque at the foot of a bronze statue or other monument. In that case, or in other situations, it can be determined or inferred that an interest relating to the monument exists. Thus, augmentation component 124 can select additional content 126 such as an audio voice-over related to the monument that recites the text of the plaque (e.g. employing well-known means of text-to-speech translation techniques) or can provide other related information obtained elsewhere, for instance from additional content sources 125. Such features can be useful as a matter of convenience, to aid those visually impaired or to provide translation to a native or known language.

As another example, consider entity $\mathbf{108_6}$ of FIG. 3, which marks a street or intersection in the present-day view, but may have once been the site of a past historical event, as is exemplified by additional content $\mathbf{126_3}$. As view 106 is substantially centered here, audio information can be presented relating to the famous duel of 1873, with, for example, the "X" or other location indicia highlighted or flashing to indicate the particular location associated with the audio information being presented. Rather than being based upon an area of focus, additional content $\mathbf{126_3}$ associated with the duel can be provided upon selection, such as clicking a cursor on the "X" or based upon tactile selection in connection with a touch-based display.

Likewise, along with (or in lieu of) the audio presentation, additional content $\mathbf{126_3}$ can overlay, or otherwise be displayed at that location, associated video content, such as a video documentary or a dramatization of the duel. Appreciably, the A/V additional content $\mathbf{126_3}$ can be panoramic or larger than the field of view of the camera such that moving the camera from side-to-side (e.g., changing the view 106 of the environment) reveals different views or portions of the video and/or changes the volume, frequency, or pitch of the associated sounds. In a similar manner, additional content 126 associated with the Italian restaurant, such as menus, specials, coupons, reservations, wait times, or even real-time or modeled video of the interior or atmosphere can be provide, e.g. by selecting the addition content direction arrow labeled 126$_1$.

In addition, based upon a profile and/or an ad model, various other additional content 126 can be surfaced, examples of which are provided in connection with reference numerals 126$_4$-126$_6$. For example, based upon a calendar, agenda, or schedule, additional content 126$_4$ can be presented indicating the time and location of a scheduled meeting, say at a conference room or, as depicted here, at the local museum. Additional content 126$_5$, potentially based upon a contact list, social network, or another trust-based network where third party information is voluntarily provided to trusted members, can include location-based information, which can provide an indication that a friend will arrive at the bus stop in about 15 minutes.

For instance, a query of the associated bus schedule can yield a potential arrival time/place once it is known that Ross boarded the bus—information that Ross might be willing to share with trusted parties, such as friends, family or the like. The final example is in connection with additional content 126$_6$. It should be underscored that in the actual view 106, the marquee advertised a production of "Carmen." However, the associated operator of the device that outputs presentation 402 might have recently attended a production of "Carmen;" might be too busy at today to attend what is now showing; might be free at a later time, say next Tuesday at 7:30 pm; or might simply dislike "Carmen" or prefer operas by Mozart such as "Marriage of Figaro." Hence, what is ultimately presented as additional content 126$_6$ can replace features of view 106 and can be obtained, e.g. by a query of the opera house's website, and selected based upon the operator's profile (e.g., schedule of availability, recent transactions, preferences . . . ) and/or an ad model, all of which is further discussed in connection with FIG. 6. Appreciably, selecting additional content 126$_6$ can reference convenient ticketing purchase options as well.

Figure 5:
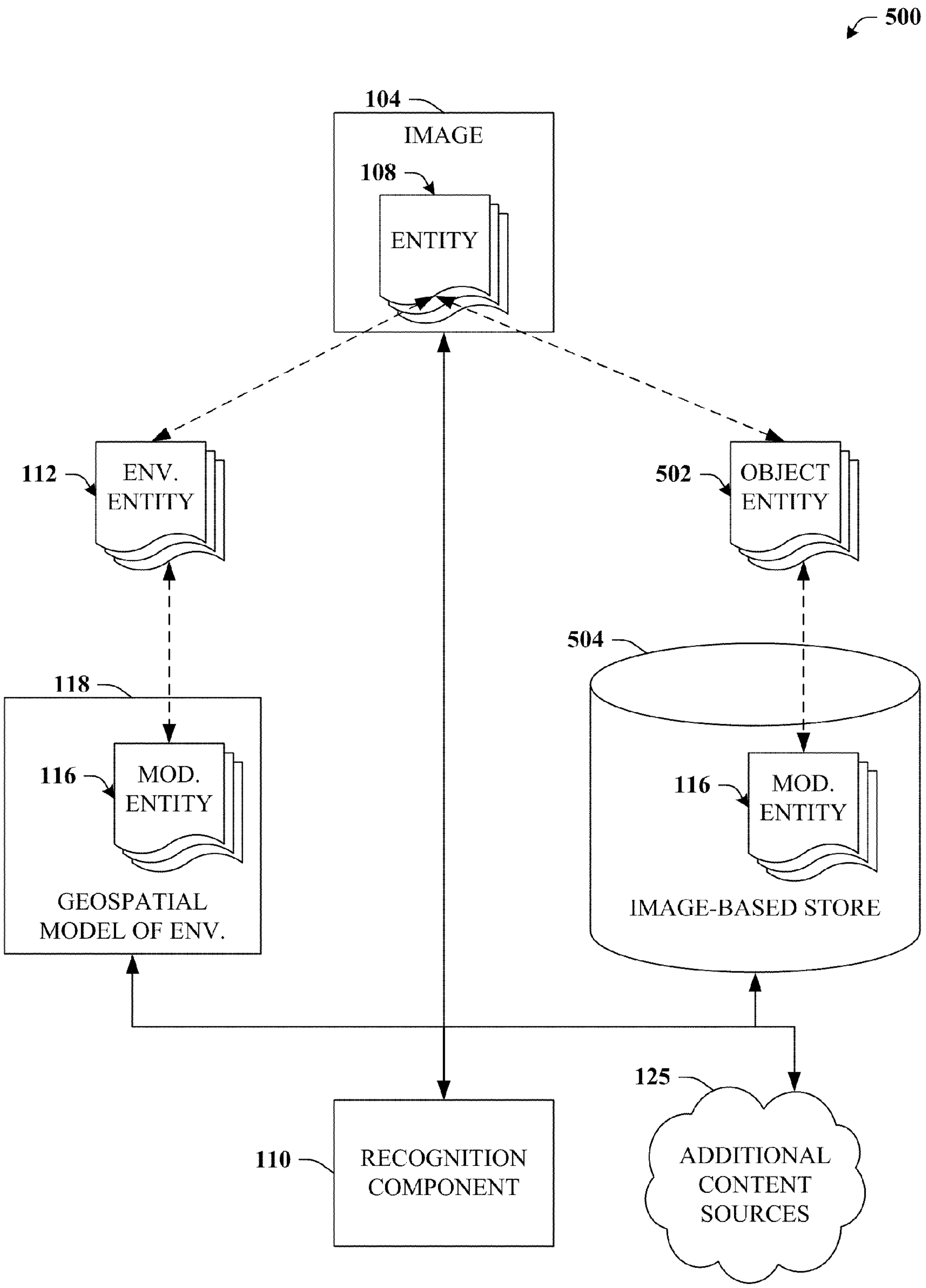
FIG. 5 depicts a block diagram of a computer-implemented system that illustrates example entity classification and/or examination.

Turning now to FIG. 5, system 500 illustrates example entity classification and/or examination. System 500 can include recognition component 110 that can match entity 108 included in image 104 with a corresponding modeled entity 116 as described supra. As was also previously introduced, entity 108 can be categorized as one or both environment entity 112 or object entity 502. Accordingly, set 108 of entities included in view 106 can include set 112 of environment entities and/or set 502 of object entities. While much of the prior discussion has been directed to environment entities 112, it should be underscored that recognition component 110 can identify object entities 502 included in image 104 as well. Moreover, object entities 502 can be the subject of many of the features described herein For example, object entity 502, in image format, can form the basis of a query to image-based data store 504. The object entity 502 can then be correlated with object records and/or modeled entity 116 included in image-based data store 504. Based upon the match, augmentation component 124 can select additional content 126 included in or referenced by image-based data store 504 (e.g., tags that reference additional content sources 125). For instance, consider an image of a bottle of wine that a user snaps because she finds that wine particularly appetizing. Said image can be employed to match the pictured entities 108 (e.g., the image of the wine label, the shape or color of the bottle . . . ) with a wine product included in the image-based data store 504, which can then form the basis of selecting additional content 126 from among information included in image-based data store 504 and/or additional content sources 125.

It should be appreciated that numerous other examples are contemplated apart from the wine bottle example introduced above. For instance, object entity 502 can be a representation of a logo, a brand, or a trademark. Additionally or alternatively, object entity 502 can be a representation of a sign, a poster, a menu, a billboard, or an advertisement. Other examples of object entity 502 can include a representation of a graphical or visual work with artistic, entertainment, or commercial value; a book, a compact disc (CD), a digital versatile disc (DVD), a product, or product packaging; or a residence, a public site, a commercial site, or a landmark.

Thus, a user can potentially image items in a pantry or a refrigerator or freezer, and presentation 402 of that image can include additional content 126 such as dates of purchase and/or estimated remaining shelf life (e.g. based upon product identification in connection with purchase/transaction histories included in a profile and/or additional content sources relating to shelf life for the identified product). Object entities 502 can also provide a convenient or useful way of leveraging additional content 126 in audio formats. For example, consider a user who is browsing music in a second-hand CD store. The user can capture image 104 of a particular CD jewel case, and then audio samples of various tracks from the CD album can be provided with presentation 402 as described herein.

Figure 6:
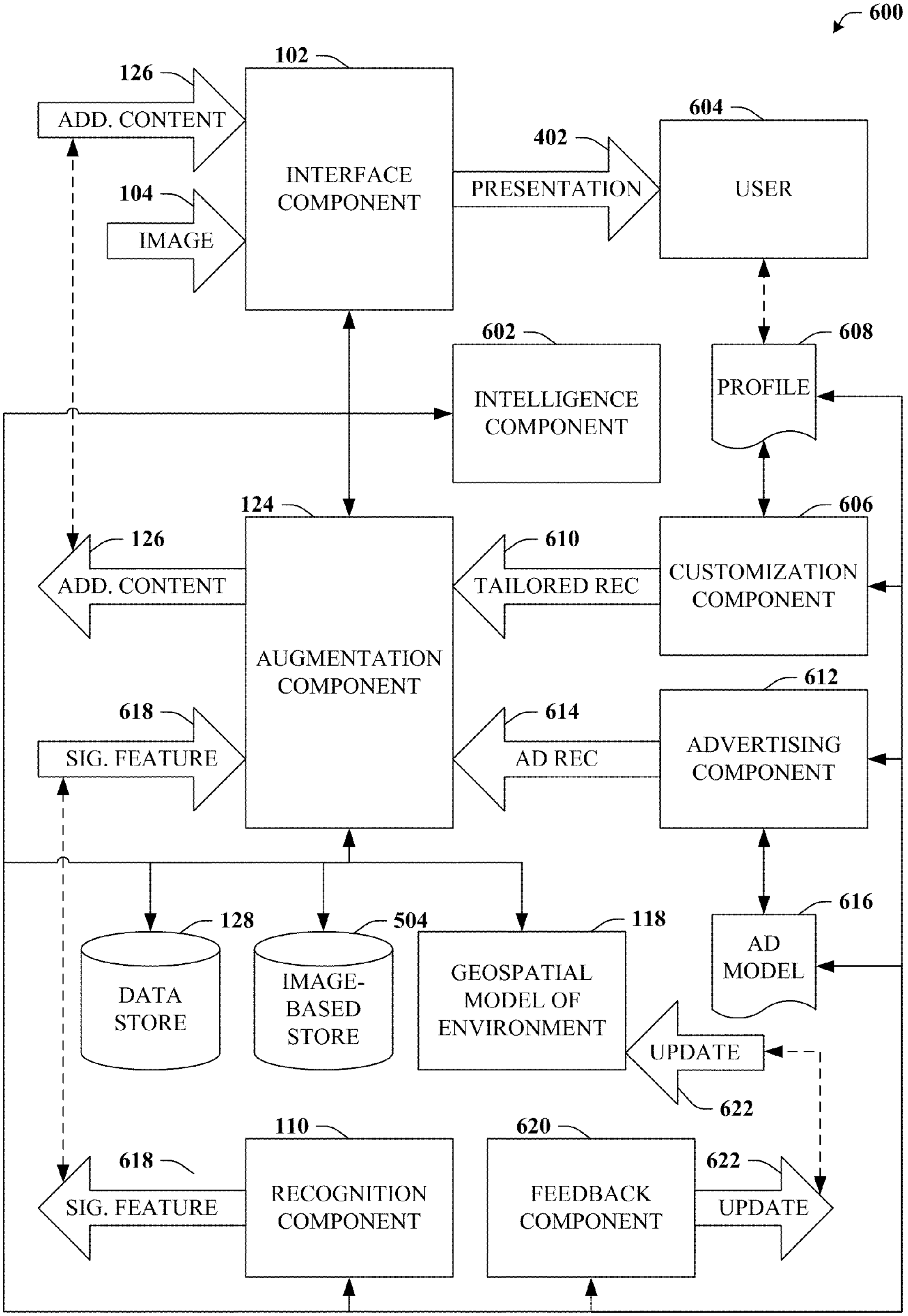
FIG. 6 is a block diagram of a system that can further tailor content based upon profile information and/or advertising models.

With the foregoing in mind, FIG. 6 can now be referenced. FIG. 6 illustrates system 600 that can further tailor content based upon profile information and/or advertising models. Generally, system 600 can include interface component 102, recognition component 110, and augmentation component 124 as substantially described herein. In particular, interface component 102 can receive image 104 and, based upon correlations between pictured entities 108 and modeled entities 116 (e.g., those included in geospatial model 118 and/or image-based store 504), recognition component 110 can established matches and can also scope a modeled view 120, the latter typically aided by location and direction indicia associated with the image 104. Thus, augmentation component 124 can then select additional content 126 that can be displayed to user 604 by interface component 102 as presentation 402, which generally includes all or portions of image 104.

Typically, augmentation component 124 will select additional content 126 that is deemed to be relevant based upon various settings, defaults, or contextual information or inferences thereof. As has been conceptually introduced supra by way of various examples etc., augmentation component 124 can be aided by customization component 606 that can tailor additional content 126 based upon profile 608 that is associated with user 604. Thus, customization component 606 can provide tailored recommendation 610 to augmentation component 124, wherein tailored recommendation 610 can be deemed to be especially relevant in light of profile 608, and thus particularly well-suited to user 604. Thus, augmentation component 124 can have the option of selecting additional content 126 normally as well as choosing from among one or more tailored recommendations 610.

Profile 608 or other data employed by customization component 606 can include can include a variety of information relating to user 604 (or an associated device), such as that which is expressly described herein as well as other information suitable for or within the spirit of the claimed subject matter. For example, profile 608 can include preferences or defaults associated with user 604, a current or recent location of user 604, a current or recent transaction (e.g., a purchase, an encounter, a charitable donation, a rating, review, or other feedback, an input such as image 104 . . . ) of user 604, or a history of locations or transactions. Profile 608 can also include schedule or calendar information associated with user 604 or other time-related aspects, social networks, contact lists, trust relationships associated with user 604, demographic data associated with user 604 such as age, gender, income, race, residence, or the like. In addition, customization component 606 can access data relating to hobbies, interests, viewpoints, or essentially any available information that can be employed to provide tailored recommendation 610.

Several illustrations of employing such profile information, in particular scheduling and social networking information contained therein are illustrated in FIG. 4 with reference to, e.g. elements $\mathbf{126_4}$-$\mathbf{126_6}$. However, it should be appreciated that numerous other examples can exist. For example, name labels can be displayed over individuals in view 106 if such information is authorized, such as for those in a trusted network. This can be especially useful when one's social network is particularly large or extended out many degrees, or simply when names are difficult for an operator (e.g., user 604) to remember.

System 600 can also include advertising component 612 that can recommend additional content 126 in the form of ad-based recommendation 614. Advertising component 612 can provide ad-based recommendation 614 based upon advertising model 616. Advertising model 616 can be based upon a pay for attention model in which advertisers can bid to surface associated content and/or to become more visible in presentation 402. Additionally or alternatively, the advertising model 616 can be based upon rankings of the advertisers. It should be appreciated that advertising recommendation 614 can be further filtered or tailored by customization component 610 based upon profile 608.

To illustrate additional capabilities, recognition component 110 can further identify significant feature 618 that can be included in at least one of view 106 of the local environment, the local environment, image 104, modeled view 120, the model of the environment (e.g., set 116 of modeled entities), or additional content 126. Upon identification of signification feature 618, augmentation component 124 can determine or infer a suitable manner to accentuate or obscure significant feature 618, and interface component 102 can update presentation 402 accordingly.

For example, consider a crowded environment such as a subway terminal, a concert, or theme park, in which view 106 includes a large number of persons in the local environment. In such a situation, it can be difficult to spot persons whom user 604 might be interested in identifying. However, recognition component 110 can attach a level of significance to a subset of those in the local environment (e.g., based upon social networks). Augmentation component 124 can then determine a suitable manner to accentuate or obscure those persons (denoted as significant features 618), which can be to insert name labels over some recognized individuals as described supra, or to highlight or outline their physical forms in presentation 402, or to increase the relative size of significant features 618. Therefore, friends or colleagues one might otherwise pass by without noticing in a crowded subway can now be quickly spotted. Likewise, wayward children can be more easily located, e.g., in a crowded theme park, or vice versa aiding children to locate parents. As another example, the parties involved in blind or first dates can be identified instantly potentially avoiding the sometime awkward moments when neither party is entirely sure of the other's identity.

Appreciably, in addition to accentuating, augmentation component 124 can also recommend deemphasizing or obscuring significant features 618. This can be applied to the above examples in that all but the significant features 618 are removed or deemphasized. However, significant features 618 can also be identified by recognition component 110 as elements that should be actively removed from presentation 402. For instance, suppose user 604 is politically or morally opposed to the business practices of a particular advertiser or, say, dislikes litter. In such cases, recognition component 110 can identify instances of litter or references to particular advertisers as significant features 618, and those features 618 can be obscured from presentation 402 such as by omitting them entirely or replacing with additional content 126.

It should be further understood that in some cases significant feature can be slightly beyond the periphery of the field of view. For example important or relevant features that are nearby but not actually within the scope of view 106 can be surfaced or referenced in a suitable manner. Likewise, it should also be understood that significant feature 618 need not necessarily be a visual feature. Rather, significant feature 618 can be, e.g., an audio feature. For instance, consider the case in which user 604 is in a noisy environment in which a colleague is speaking to or calling out to user 604. Recognition component 110 can identify the colleague's speech as significant feature 618, and interface component 102 can accentuate the colleague's speech to make it more apparent to user 604. As another example, consider the case in which user is listening to music, e.g., by way of a portable media device and therefore is not readily aware of sounds occurring in the local environment. Further suppose recognition component 110 detects an ambulance siren in the local environment and identifies the siren as significant feature 618. In this case, interface component 102 can be instructed to mute the music temporarily and/or stream a representation of the siren to suitable output devices such that the user 604 can be aware of the siren.

System 600 can also include feedback component 620 that can propagate update 622 in order to update to geospatial model 118. Update 622 can be based upon the image and, more particularly, based upon a divergence between image 104 and modeled view 120. Typically, updates 622 will relate to changes to the local environment in the time since creation or the last updates of the geospatial model 118, such as a new construction or a renovation to a building. Of course, other examples can exist, however, it is useful to note that geospatial model 118 can be kept substantially accurate and/or current simply by user-based utilization of associated systems rather than by more expensive or inefficient means such as periodic auditing or the like.

In addition, system 600 can also include intelligence component 602 that can provide for or aid in various inferences or determinations. In particular, in accordance with or in addition to what has been described supra with respect to intelligent determination or inferences provided by various components described herein. For example, all or portions of recognition component 110, augmentation component 124, customization component 606, advertising component 612, or feedback component 620 can support machine learning techniques, potentially based upon historic data or past decisions, to refine various inferences. Additionally or alternatively, some or all of the described components can employ Bayesian principles or stochastic techniques to predict preferred or likely outcomes based available data.

It is to be appreciated that intelligence component 602 can be operatively coupled to all or portions of components 110, 124, 606, 612, or 620. Additionally or alternatively, all or portions of intelligence component 602 can be included in one or more components described herein. Moreover, intelligence component 602 will typically have access to all or portions of data sets described herein, such as data store 128, additional content sources 125, geospatial model 118, or image-based data store 504, and can furthermore utilize previously determined or inferred data.

Accordingly, in order to provide for or aid in the numerous inferences described herein, intelligence component 602 can examine the entirety or a subset of the data available and can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g. support vector machines, neural networks, expert systems, Bayesian belief networks, fuzzy logic, data fusion engines . . . ) can be employed in connection with performing automatic and/or inferred action in connection with the claimed subject matter.

A classifier can be a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g. naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Figure 7:
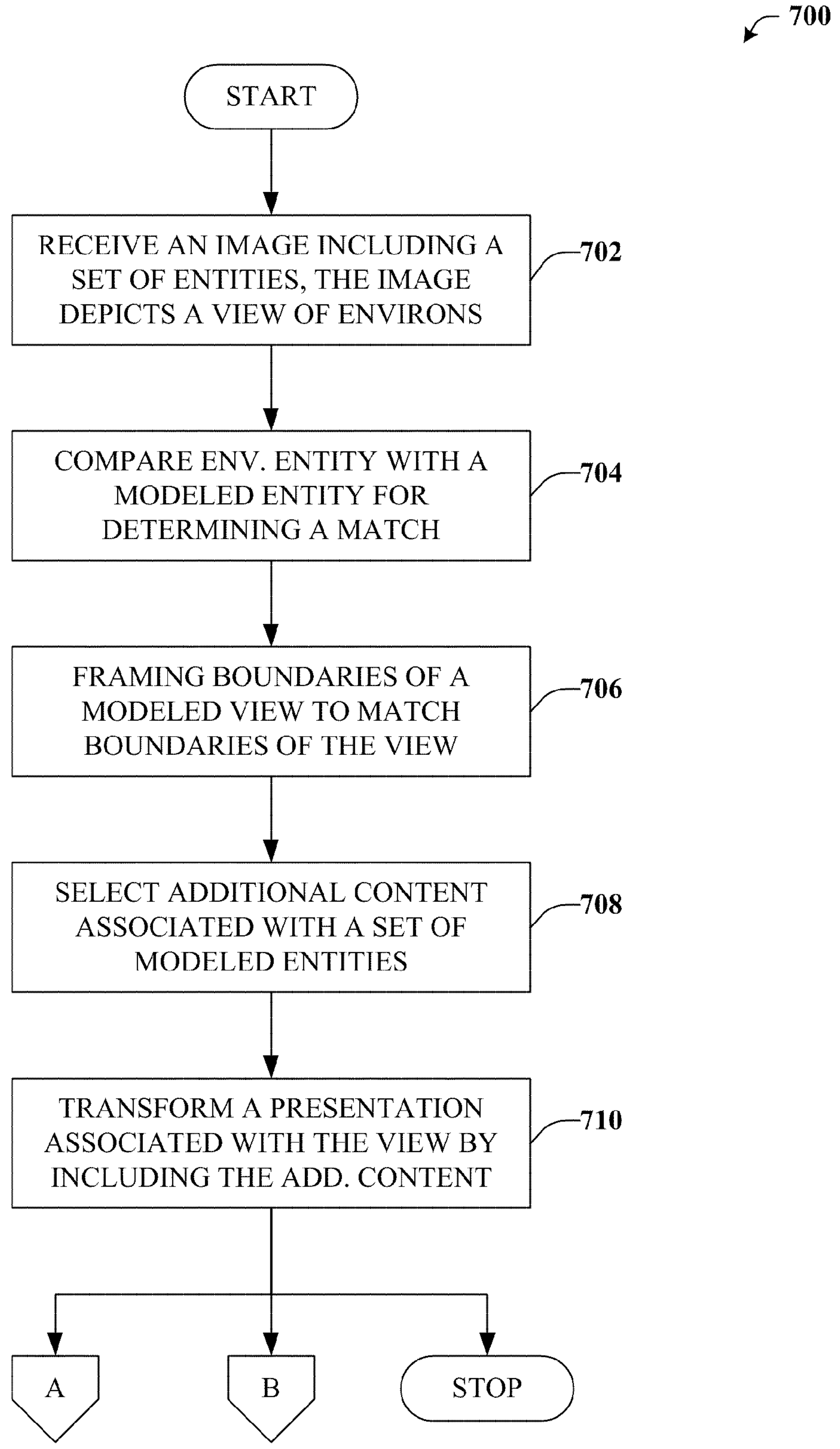
FIG. 7 depicts an exemplary flow chart of procedures that define a method for improving an experience in connection with a field of view of a local environment.
Figure 8:
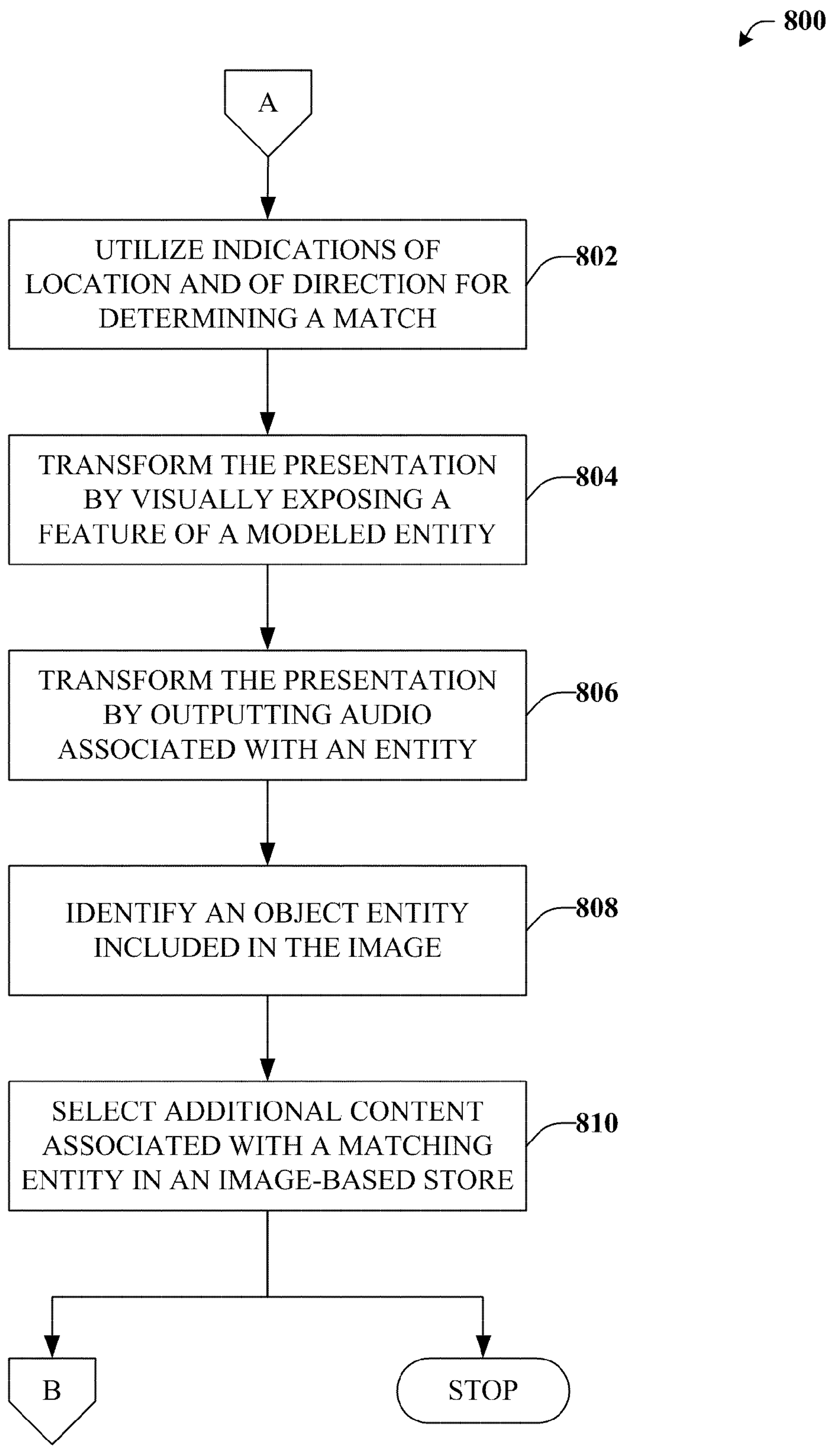
FIG. 8 illustrates an exemplary flow chart of procedures that define a method for providing additional features in connection with improving an experience in connection with a local environment.
Figure 9:
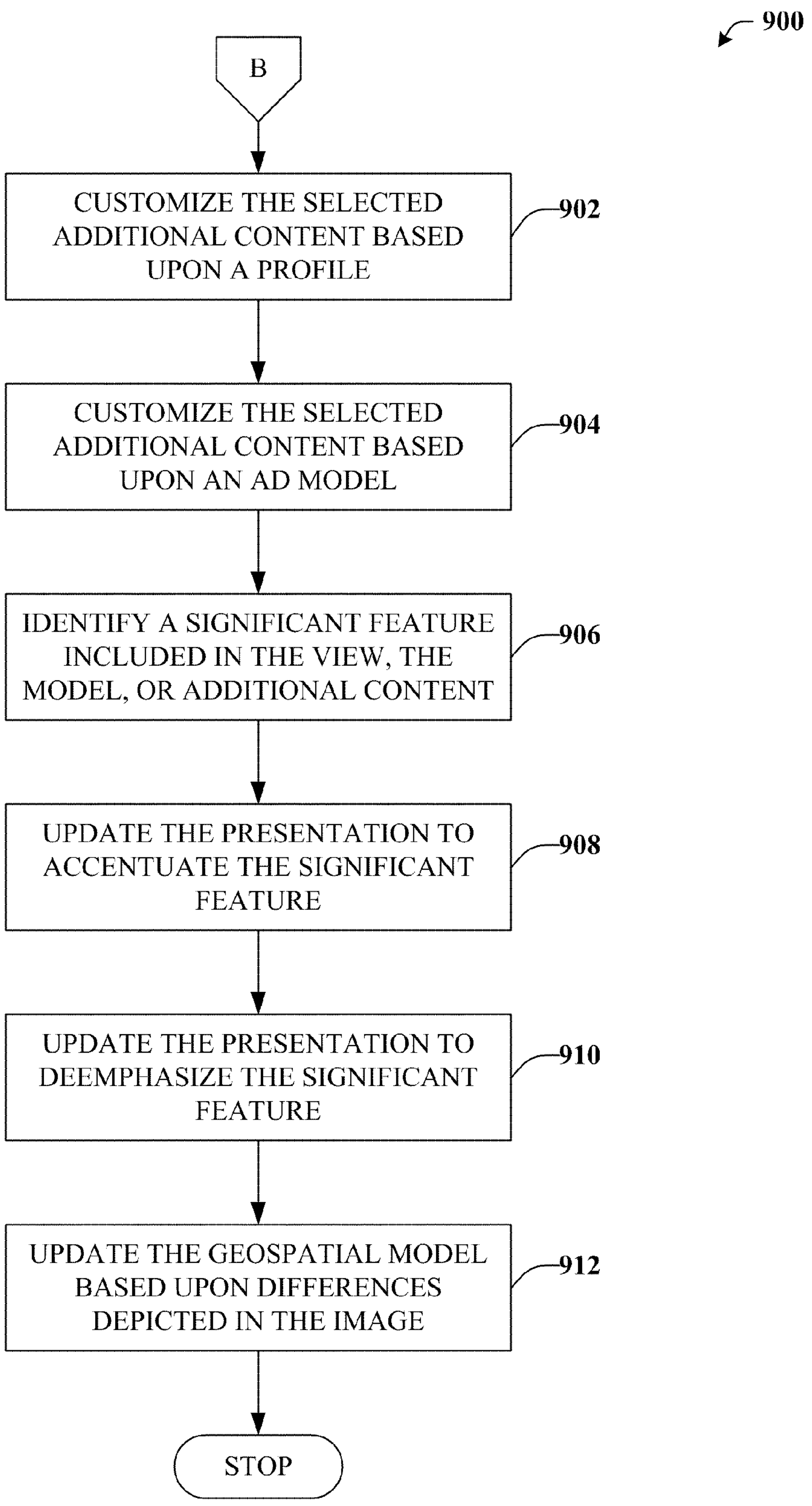
FIG. 9 is an exemplary flow chart of procedures defining a method for further customizing additional content.

FIGS. 7, 8, and 9 illustrate various methodologies in accordance with the claimed subject matter. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

With reference now to FIG. 7, exemplary computer implemented method 700 for improving an experience in connection with a field of view of a local environment is illustrated. Generally, at reference numeral 702, an image including a set of entities can be received. Typically, the image will depict a view of an identifiable portion of a local environment. However, in other cases, the image can depict identifiable real entities that exist in the environment. At reference numeral 704, an environment entity included in the view can be compared to a corresponding modeled entity included in a geospatial model of the environment for determining a match.

At reference numeral 706, boundaries associated with a modeled view associated with the geospatial model can be framed to match boundaries depicted by the view based upon the comparing described at reference numeral 704. For example, as entities included in the image are correlated to associated modeled entities, the field of view of the image can be matched to a substantially identical a modeled field of view with respect to the geospatial model.

Next to be described, at reference numeral 708 additional content associated with a set of modeled entities included in the geospatial model can be selected. The additional content can relate to services or data related to one or more of the modeled entities. At reference numeral 710, a presentation associated with the view can be transformed by including the additional content with the presentation.

Referring to FIG. 8, exemplary computer implemented method 800 for providing additional features in connection with improving an experience in connection with a local environment is depicted. At reference numeral 802, an indication of location and an indication of direction can be utilized for determining the match. For example, the comparisons made to match entities in the image with modeled entities and to scope the correct modeled view at reference numerals 704 and 706, respectively can employ both an indication of location (e.g., to identify the particular local environment) and an indication of direction (e.g., to identify the particular view of the local environment that a user is interested). Notably, indications of location and direction can be provided in 3-D such that, e.g. location can include a height or altitude component and direction can include both panoramic and elevation angles or directions.

At reference numeral 804, the presentation can be transformed by visually exposing a feature of a modeled entity. Likewise, at reference numeral 806, the presentation can be transformed by outputting audio associated with a modeled entity. In either case, it should be appreciated that the modeled entity can be included in a geospatial model of the environment that is associated with an environment entity; or the modeled entity can be included in an image-based data store that is associated with an object entity that is identified at reference numeral 808. At reference numeral 810, additional content associated with a matching object entity can be selected, wherein the additional information is either included in or referenced by the image-based data store.

With reference now to FIG. 9, method 900 for further customizing additional content is illustrated. Generally, at reference numeral 902, the selected additional content can be customized based upon a profile associated with a user. For example, the profile can include can include a variety of information relating to the user (or an associated device). For instance, the profile can include preferences or defaults associated with the user, a current or recent location of the user, a current or recent transaction (e.g. a purchase, an encounter, a charitable donation, a rating, review, or other feedback, an input such as the image or view . . . ) of the user, or a history of locations or transactions. The profile can also include schedule or calendar information associated with the user or other time-related aspects, social networks, contact lists, trust relationships associated with the user, demographic data associated with the user such as age, gender, income, race, residence, or the like. In addition, the profile can include or reference data relating to hobbies, interests, viewpoints, or essentially any available information that can be employed to provide tailored additional content.

At reference numeral 904, the selected additional content can be customized based upon an advertising model. As one example, the advertising model can allow advertisers to bid for the opportunity to have content of their own designation surfaced to the user. Such content can be appropriately limited to suitable fields of view and also further limited based upon the profile of the user as discussed at reference numeral 902. At reference numeral 906, a significant feature included in at least one of the view of the local environment, the local environment, the model of the environment, or the additional content can be identified.

Appreciably, the significant feature can be either a visual feature or an audio feature. Moreover, at reference numeral 908, the presentation can be updated to accentuate the significant feature, whereas at reference numeral 910, the presentation can be updated to deemphasize the significant feature. In another aspect, at reference numeral 912, the geospatial model of the environment can be updated based upon differences depicted in the image vis-à-vis the associated modeled entities included in the geospatial model.

Figure 10:
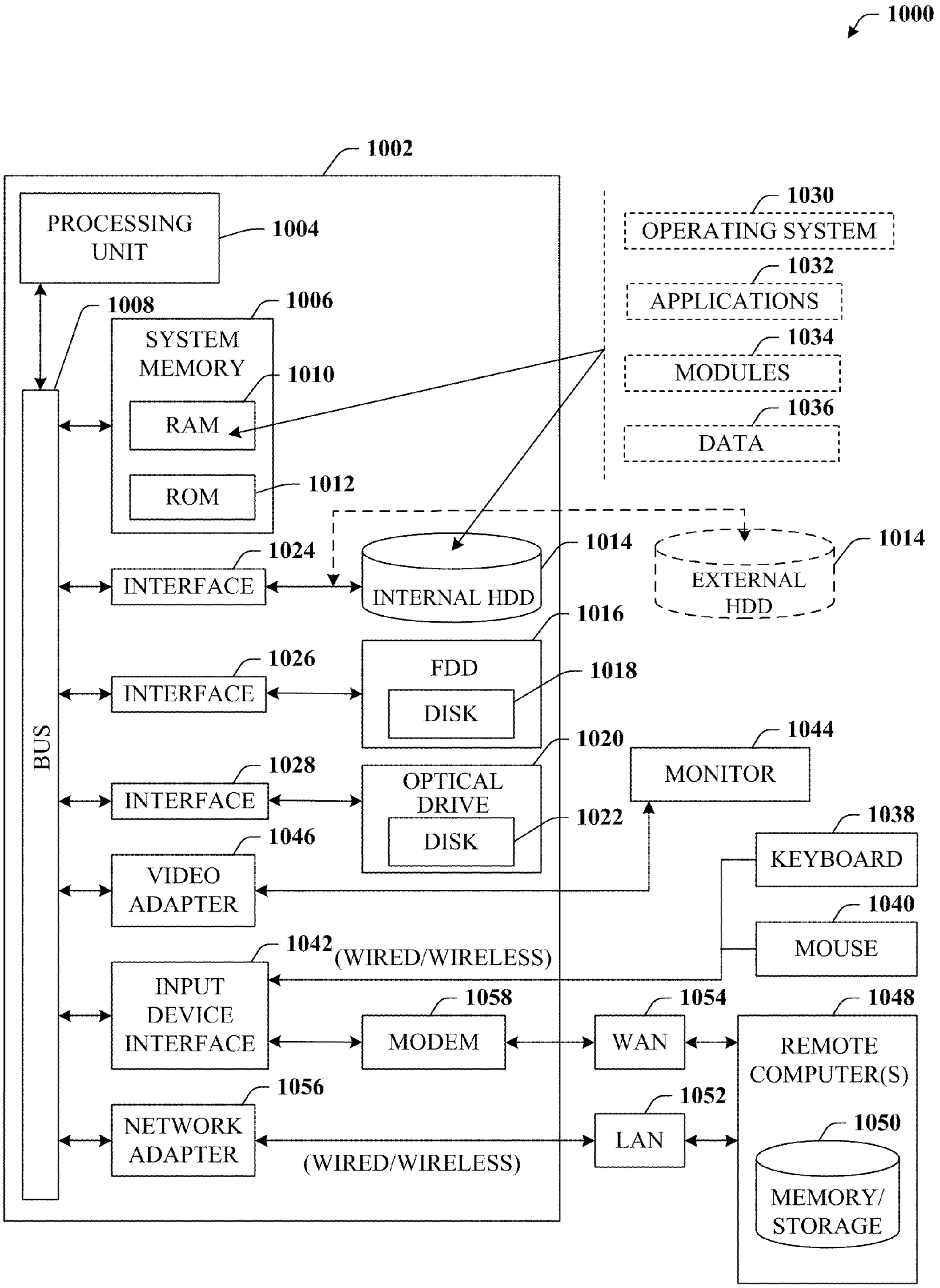
FIG. 10 illustrates a block diagram of a computer operable to execute the disclosed architecture.

Referring now to FIG. 10, there is illustrated a block diagram of an exemplary computer system operable to execute the disclosed architecture. In order to provide additional context for various aspects of the claimed subject matter, FIG. 10 and the following discussion are intended to provide a brief, general description of a suitable computing environment 1000 in which the various aspects of the claimed subject matter can be implemented. Additionally, while the claimed subject matter described above may be suitable for application in the general context of computer-executable instructions that may run on one or more computers, those skilled in the art will recognize that the claimed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media can include both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 10, the exemplary environment 1000 for implementing various aspects of the claimed subject matter includes a computer 1002, the computer 1002 including a processing unit 1004, a system memory 1006 and a system bus 1008. The system bus 1008 couples to system components including, but not limited to, the system memory 1006 to the processing unit 1004. The processing unit 1004 can be any of various commercially available processors. Dual microprocessors and other multi-processor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 may also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE1394 interface technologies. Other external drive connection technologies are within contemplation of the subject matter claimed herein.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the claimed subject matter.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the claimed subject matter can be implemented with various commercially available operating systems or combinations of operating systems.

A user can enter commands and information into the computer 1002 through one or more wired/wireless input devices, e.g. a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE1394 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 may operate in a networked environment using logical connections via wired and/or wireless communications to one or more remote computers, such as a remote computer(s) 1048. The remote computer(s) 1048 can be a workstation, a server computer, a router, a personal computer, a mobile device, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g. a wide area network (WAN) 1054. Such LAN and WAN networking environments are commonplace in offices and companies, and facilitate enterprise-wide computer networks, such as intranets, all of which may connect to a global communications network, e.g. the Internet.

When used in a LAN networking environment, the computer 1002 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g. computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10 BaseT" wired Ethernet networks used in many offices.

Figure 11:
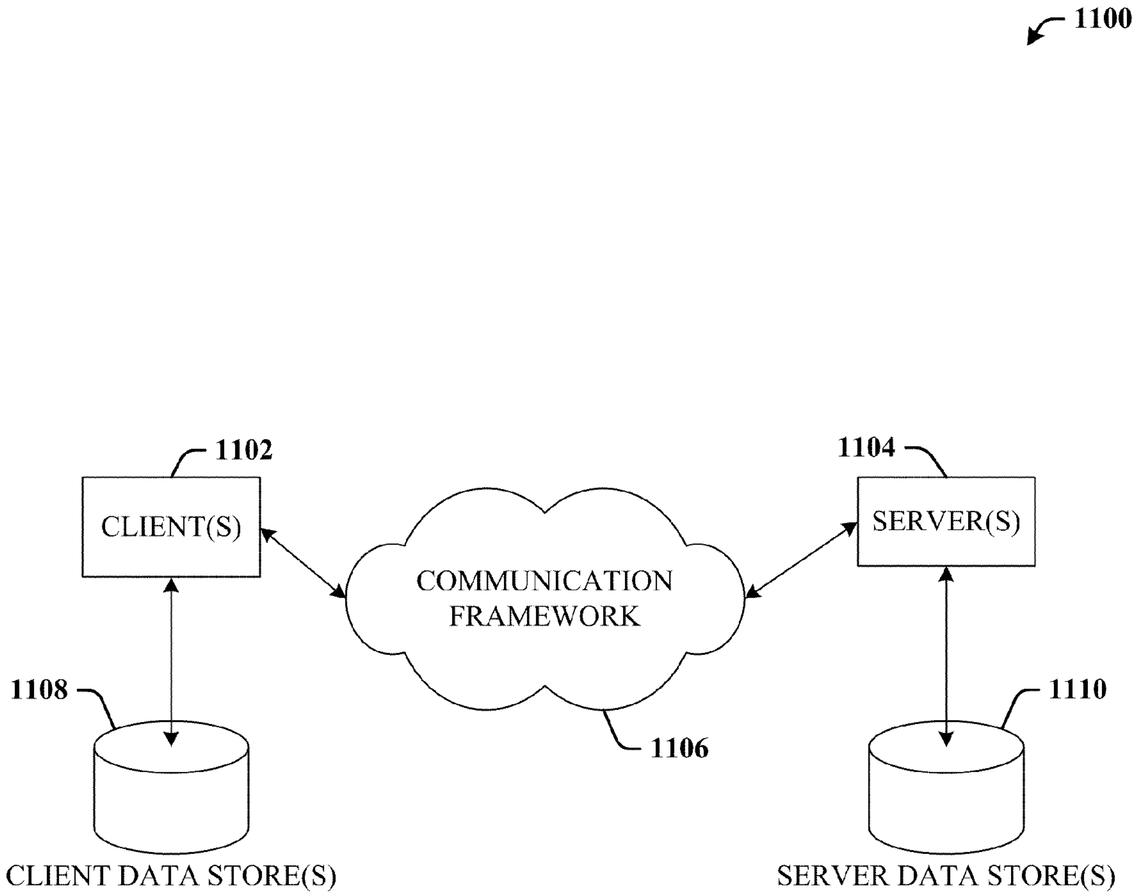
FIG. 11 illustrates a schematic block diagram of an exemplary computing environment.

Referring now to FIG. 11, there is illustrated a schematic block diagram of an exemplary computer compilation system operable to execute the disclosed architecture. The system 1100 includes one or more client(s) 1102. The client(s) 1102 can be hardware and/or software (e.g., threads, processes, computing devices). The client(s) 1102 can house cookie(s) and/or associated contextual information by employing the claimed subject matter, for example.

The system 1100 also includes one or more server(s) 1104. The server(s) 1104 can also be hardware and/or software (e.g., threads, processes, computing devices). The servers 1104 can house threads to perform transformations by employing the claimed subject matter, for example. One possible communication between a client 1102 and a server 1104 can be in the form of a data packet adapted to be transmitted between two or more computer processes. The data packet may include a cookie and/or associated contextual information, for example. The system 1100 includes a communication framework 1106 (e.g., a global communication network such as the Internet) that can be employed to facilitate communications between the client(s) 1102 and the server(s) 1104.

Communications can be facilitated via a wired (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

What has been described above includes examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g. a functional equivalent), even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A method for enhancing an experience associated with a field of view of a local environment, comprising:

capturing, by a device, an image that depicts a view of a local environment, the view being a specific portion of the local environment that includes a set of entities, the device having an associated display;

displaying the image that depicts the view of the local environment;

identifying a correlation between an environment entity included in the view and a corresponding modeled entity included in a three-dimensional (3D), spatially accurate geospatial model of the environment based upon a relative orientation, shape, or size of the environment entity;

defining boundaries of a modeled view of the geospatial model corresponding to associated boundaries of the view depicted in the image based upon the correlation;

identifying a modeled object entity from a set of modeled entities included in the geospatial model based on the modeled view of the geospatial model having the defined boundaries;

selecting additional content associated with the included representation of the identified modeled object entity included in the geospatial model, the identified modeled object entity corresponding to an entity that is non-existent in the image; and presenting the additional content in association with the displayed image.

2. The method of claim 1, further comprising at least one of (1) utilizing an indication of location and an indication of direction in order to identify the correlation between the environment entity and the modeled entity; (2) identifying a second environment entity included in the view based upon an examination of an associated modeled entity included in the modeled view of the geospatial model; (3) examining the modeled view of the geospatial model to identify a set of visible entities with respect to the view; or (4) examining the modeled view of the geospatial model to identify a set of occluded entities with respect to the view.

3. The method of claim 1, wherein the geospatial model is at least one of(1) a 3D, spatially accurate street-level or non-orthogonal representation of the local environment; (2) a 3D, spatially accurate representation of the local environment and disparate physical environments; or (3) a 3D spatially accurate representation of the local environment with at least one of a historic 3D representation of the local environment or a future 3D representation of the local environment.

4. The method of claim 1, further comprising presenting an audio stream when the view is substantially focused on the identified modeled object entity.

5. The method of claim 1, wherein the set of entities included in the view includes a set of environment entities that each depicts a stationary object, landmark, or point of interest; and a set of object entities, the set of object entities including an object entity corresponding to the identified modeled object entity.

6. The method of claim 1, wherein the selected additional content associated with the included representation of the identified modeled object entity is included in or referenced by an image-based data store.

7. The method of claim 1, further comprising tailoring additional content based upon a profile associated with a user.

8. The method of claim 7, wherein the additional content is tailored based upon information included in the profile that relates to at least one of a schedule or a social network.

9. The method of claim 1, further comprising recommending additional content based upon an advertising model.

10. The method of claim 1, further comprising identifying a significant feature that is included in at least one of the view of the local environment, the local environment, the model of the environment, or the additional content, wherein the significant feature is at least one of an individual who is represented in an associated social network, an environment entity or object entity that is deemed of high or low importance based upon a profile, or a sound extant in the local environment.

11. The method of claim 10, further comprising at least one of obscuring the identified significant feature in the presented content or exposing a feature of a modeled entity included in the set of modeled entities, the feature is occluded or non-existent in the view.

12. The method of claim 1, further comprising updating the geospatial model of the environment based upon features included in the image that reliably suggest the local environment has changed since creation of or a last update to the geospatial model.

13. A computer implemented method for improving an experience in connection with a field of view of a local environment, comprising:

capturing, by a device having an associated display, an image including a set of entities, the image depicting a view of an identifiable portion of a local environment;

employing a processor for comparing an orientation, shape, or size of an environment entity included in the view depicted by the image to a corresponding-modeled entity included in a 3D geospatial model of the environment for determining a match;

framing associated boundaries of a modeled view of the 3D geospatial model to match boundaries depicted by the view based upon the comparing;

identifying at least one modeled object entity from a set of modeled entities included in the 3D geospatial model based on the modeled view having the associated boundaries;

selecting additional content associated with the at least one modeled object entity, the at least one modeled object entity corresponding to an entity that is non-existent in the image;

transforming a presentation of the captured image depicting the view of the local environment by including the additional content with the presentation; and displaying the transformed presentation of the captured image depicting the view of the local environment.

14. The method of claim 13, further comprising at least one of the following acts:

identifying an object entity included in the image; or selecting additional content associated with a matching object entity included in or referenced by an image-based data store.

15. The method of claim 13, further comprising at least one of the following acts:

customizing the selected additional content based upon a profile associated with a user; or customizing the selected additional content based upon an advertising model.

16. The method of claim 13, wherein the additional content comprises a video dramatization that is panoramic or larger than the field of view of the image or the associated display.

17. The method of claim 13, further comprising identifying a significant feature that is included in at least one of the view of the local environment, the local environment, the model of the environment, or the additional content, wherein the significant features is at least one of an individual who is represented in an associated social network, an environment entity or object entity that is deemed of high or low importance based upon a profile, or a sound extant in the local environment.

18. The method of claim 17, further comprising obscuring the identified significant feature in the presented content.

19. A computer implemented system that augments a view of a local environment in order to enrich an experience associated with a presentation of the view, comprising:

an image capture device having an associated display, the image capture device further comprising:

an interface component that receives an image that depicts a view of a local environment, the view is a specific portion of the local environment that includes a set of entities;

a recognition component that matches an environment entity included in the view depicted by the image with a corresponding modeled entity included in a 3D geospatial model of the environment based upon an apparent orientation, shape, or size of the environment entity, the recognition component defines boundaries of a corresponding modeled view to correspond to associated boundaries of the view based upon an indication of position, an indication of direction, and a correlation between the environment entity and the corresponding modeled entity, the recognition component further identifying at least one modeled object entity from a set of modeled entities included in the 3D geospatial model based on the corresponding modeled view of the 3D geospatial model having the defined boundaries; and an augmentation component that selects additional content associated with a representation included in the at least one modeled object entity, the at least one modeled object entity corresponding to an entity that is non-existent in the image, the at least one modeled object entity including a representation of at least one of a logo, a brand, or a trademark; an advertisement; a graphical work with artistic, entertainment, or commercial value; a book, a compact disc (CD), a digital versatile disc (DVD), or product packaging, the interface component concurrently displays the view and presents the additional content via the associated display.

* * * * *